US011961460B2

(12) United States Patent
Huang et al.

(10) Patent No.: US 11,961,460 B2
(45) Date of Patent: *Apr. 16, 2024

(54) DISPLAY PANEL AND DISPLAY DEVICE WITH REDUCED SCREEN FLICKER

(71) Applicant: Xiamen Tianma Display Technology Co., Ltd., Xiamen (CN)

(72) Inventors: Wanming Huang, Xiamen (CN); Jieliang Li, Xiamen (CN); Yuheng Zhang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,797

(22) Filed: Feb. 2, 2023

(65) Prior Publication Data

US 2023/0186838 A1 Jun. 15, 2023

Related U.S. Application Data

(63) Continuation of application No. 17/646,599, filed on Dec. 30, 2021, now Pat. No. 11,580,898.

(30) Foreign Application Priority Data

Sep. 14, 2021 (CN) ......................... 202111074968.5

(51) Int. Cl.
*G09G 3/32* (2016.01)

(52) U.S. Cl.
CPC ......... *G09G 3/32* (2013.01); *G09G 2310/027* (2013.01); *G09G 2310/08* (2013.01); *G09G 2320/0247* (2013.01)

(58) Field of Classification Search
CPC ...... G09G 3/32-3291; G09G 2300/0421-043; G09G 2300/0809; G09G 2300/0842; G09G 2300/0861; G09G 2310/0243; G09G 2310/0267; G09G 2310/027; G09G 2310/0275; G09G 2310/04; G09G 2310/06; G09G 2310/08; G09G 2320/0247-0266
See application file for complete search history.

(56) References Cited

U.S. PATENT DOCUMENTS

2017/0188006 A1 6/2017 Park et al.
2020/0226980 A1 7/2020 Park et al.
2021/0049949 A1 2/2021 Lee et al.
2021/0241699 A1 8/2021 Lee et al.
2021/0343245 A1 11/2021 Nam et al.

*Primary Examiner* — Nathan Danielsen

(74) *Attorney, Agent, or Firm* — Anova Law Group, PLLC

(57) ABSTRACT

A display panel includes a pixel circuit. An operation process of the pixel circuit includes a first data refresh period, a data adjustment stage, and a second data refresh period set in sequence, the data adjustment stage includes a first data adjustment stage, a second data adjustment stage, and a third data adjustment stage set in sequence. The first data adjustment stage includes T1 first sub-data adjustment stages set in sequence, each first sub-data adjustment stage includes m1 data writing frames and n1 holding frames. The second data adjustment stage includes T2 second sub-data adjustment stages set in sequence, each second sub-data adjustment stage includes m2 data writing frames and n2 holding frames. The third data adjustment stage includes T3 third sub-data adjustment stages set in sequence, each third sub-data adjustment stage includes m3 data writing frames and n3 holding stages set in sequence.

12 Claims, 12 Drawing Sheets

| Main stage | Sub-stage | Quantity of sub-stages | Quantity of data writing frames in a sub-stage | Quantity of holding frames in a sub-stage |
|---|---|---|---|---|
| First data adjustment stage | First sub-data adjustment stage | T1 (8) | m1 (1) | n1 (0) |
| Second data adjustment stage | Second sub-data adjustment stage | T2 (4) | m2 (1) | n2 (1) |

FIG. 5

| Main stage | Sub-stage | Quantity of sub-stages | Quantity of data writing frames in a sub-stage | Quantity of holding frames in a sub-stage |
|---|---|---|---|---|
| First data adjustment stage | First sub-data adjustment stage | T1 (4) | m1 (1) | n1 (1) |
| Second data adjustment stage | Second sub-data adjustment stage | T2 (2) | m2 (1) | n2 (3) |

FIG. 7

| Main stage | Sub-stage | Quantity of sub-stages | Quantity of data writing frames in a sub-stage | Quantity of holding frames in a sub-stage |
|---|---|---|---|---|
| First data adjustment stage | First sub-data adjustment stage | T1 (8) | m1 (1) | n1 (0) |
| Second data adjustment stage | Second sub-data adjustment stage | T2 (4) | m2 (1) | n2 (1) |
| Third data adjustment stage | third sub-data adjustment stage | T3 (2) | M3 (1) | N3 (3) |

FIG. 9

| Main stage | Sub-stage | Quantity of sub-stages | Quantity of data writing frames in a sub-stage | Quantity of holding frames in a sub-stage |
|---|---|---|---|---|
| First data adjustment stage | First sub-data adjustment stage | T1 (8) | m1 (1) | n1 (0) |
| Second data adjustment stage | Second sub-data adjustment stage | T2 (4) | m2 (1) | n2 (1) |
| Third data adjustment stage | third sub-data adjustment stage | T3 (2) | M3 (2) | N3 (2) |

FIG. 11

| Data refresh frequency | Main stage | Sub-stage | Quantity of sub-stages | Quantity of data writing frames in a sub-stage | Quantity of holding frames in a sub-stage |
|---|---|---|---|---|---|
| F21 | First data adjustment stage | First sub-data adjustment stage | T11 (8) | m1 (1) | n1 (0) |
| | Second data adjustment stage | Second sub-data adjustment stage | T12 (4) | m2 (1) | n2 (1) |
| F22 (F21<F21) | First data adjustment stage | First sub-data adjustment stage | T21 (4) | m1 (1) | n1 (1) |
| | Second data adjustment stage | Second sub-data adjustment stage | T22 (2) | m2 (1) | n2 (3) |

FIG. 12

DISPLAY PANEL AND DISPLAY DEVICE WITH REDUCED SCREEN FLICKER

CROSS-REFERENCE TO RELATED APPLICATION

This application is a continuation of U.S. patent application Ser. No. 17/646,599, filed on Dec. 30, 2021, which claims the priority of Chinese Patent Application No. 202111074968.5, filed on Sep. 14, 2021, the entire contents of both of which are incorporated herein by reference.

TECHNICAL FIELD

The present disclosure generally relates to the field of display technology and, more particularly, relates to a display panel and a display device.

BACKGROUND

At present, display panels have been widely used in all aspects of people's daily life. For example, the display panel can be used as a display interaction module for various devices accordingly. When the display panel is in operation, the pixel units of the display panel are driven and controlled such that the screen content is continuously switched. However, when the display screen is switched, the display screen is prone to having a screen flicker to human eyes.

Therefore, there is a need to provide a display panel and a display device with reduced screen flicker. The disclosed display panel and display device are directed to solve one or more problems set forth above and other problems in the arts.

SUMMARY

One aspect of the present disclosure provides a display panel. The display panel includes a pixel circuit. An operation process of the pixel circuit includes a first data refresh period, a data adjustment stage, and a second data refresh period set in sequence, the data adjustment stage includes a first data adjustment stage, a second data adjustment stage, and a third data adjustment stage set in sequence. The first data adjustment stage includes T1 first sub-data adjustment stages set in sequence, each first sub-data adjustment stage includes m1 data writing frames and n1 holding frames, $T1 \geq 1$, $m1 \geq 0$, $n1 \geq 0$, and $m1+n1 \geq 1$. The second data adjustment stage includes T2 second sub-data adjustment stages set in sequence, each second sub-data adjustment stage includes m2 data writing frames and n2 holding frames, $T2 \geq 1$, $m2 \geq 0$, $n2 \geq 0$, and $m2+n2 \geq 1$. The third data adjustment stage includes T3 third sub-data adjustment stages set in sequence, each third sub-data adjustment stage includes m3 data writing frames and n3 holding stages set in sequence, $T3 \geq 1$, $m3 \geq 0$, $n3 \geq 0$, and $m3+n3 \geq 1$. $n1<n2<n3$, or $m1>m2>m3$, $T1>T2 \geq T3$, $T1-T2>T2-T3$, $(m3+n3)-(m2+n2)>(m2+n2)-(m1+n1)$, and $(m3+n3)/(m2+n2)=(m2+n2)/(m1+n1) \geq 1$.

Another aspect of the present disclosure provides a display panel. The display panel includes a pixel circuit. An operation process of the pixel circuit includes a first data refresh period, a data adjustment stage, and a second data refresh period set in sequence, the data adjustment stage includes a first data adjustment stage, a second data adjustment stage, and a third data adjustment stage set in sequence. The first data adjustment stage includes T1 first sub-data adjustment stages set in sequence, each first sub-data adjustment stage includes m1 data writing frames and n1 holding frames, $T1 \geq 1$, $m1 \geq 0$, $n1 \geq 0$, and $m1+n1 \geq 1$. The second data adjustment stage includes T2 second sub-data adjustment stages set in sequence, each second sub-data adjustment stage includes m2 data writing frames and n2 holding frames, $T2 \geq 1$, $m2 \geq 0$, $n2 \geq 0$, and $m2+n2 \geq 1$. The third data adjustment stage includes T3 third sub-data adjustment stages set in sequence, each third sub-data adjustment stage includes m3 data writing frames and n3 holding stages set in sequence, $T3 \geq 1$, $m3 \geq 0$, $n3 \geq 0$, and $m3+n3 \geq 1$. $n1<n2<n3$, or $m1>m2>m3$. At least one of: $T1>T2 \geq T3$, $T1-T2>T2-T3$, and $(m3+n3)-(m2+n2)>(m2+n2)-(m1+n1)$; $(m3+n3)-(m2+n2)>(m2+n2)-(m1+n1)$, and $(m3+n3)/(m2+n2)=(m2+n2)/(m1+n1) \geq 1$; or $T1>T2>T3$, $T1-T2>T2-T3$, and $(m3+n3)/(m2+n2)=(m2+n2)/(m1+n1) \geq 1$.

Another aspect of the present disclosure provides a display panel. The display panel includes a pixel circuit. An operation process of the pixel circuit includes a first data refresh period, a data adjustment stage, and a second data refresh period set in sequence, the data adjustment stage includes a first data adjustment stage, a second data adjustment stage, and a third data adjustment stage set in sequence. The first data adjustment stage includes T1 first sub-data adjustment stages set in sequence, each first sub-data adjustment stage includes m1 data writing frames and n1 holding frames, $T1 \geq 1$, $m1 \geq 0$, $n1 \geq 0$, and $m1+n1 \geq 1$. The second data adjustment stage includes T2 second sub-data adjustment stages set in sequence, each second sub-data adjustment stage includes m2 data writing frames and n2 holding frames, $T2 \geq 1$, $m2 \geq 0$, $n2 \geq 0$, and $m2+n2 \geq 1$. The third data adjustment stage includes T3 third sub-data adjustment stages set in sequence, each third sub-data adjustment stage includes m3 data writing frames and n3 holding stages set in sequence, $T3 \geq 1$, $m3 \geq 0$, $n3 \geq 0$, and $m3+n3 \geq 1$. $n1<n2<n3$, or $m1>m2>m3$. At least one of: $T1>T2 \geq T3$, $T1-T2>T2-T3$; $(m3+n3)-(m2+n2)>(m2+n2)-(m1+n1)$; or $(m3+n3)/(m2+n2)=(m2+n2)/(m1+n1) \geq 1$.

Other aspects of the present disclosure can be understood by those skilled in the art in light of the description, the claims, and the drawings of the present disclosure.

BRIEF DESCRIPTION OF THE DRAWINGS

The drawings incorporated in the specification and constituting a part of the specification illustrate the embodiments of the present disclosure, and together with the description are used to explain the principle of the present disclosure.

FIG. 5 illustrates an exemplary parameter table of the operation process of the pixel circuit in FIG. 4;

FIG. 7 illustrates an exemplary parameter table of the operation process of the pixel circuit in FIG. 6;

FIG. 9 illustrates an exemplary parameter table of the operation process of the pixel circuit in FIG. 8;

FIG. 11 illustrates an exemplary parameter table of the operation process of the pixel circuit in FIG. 10;

FIG. 12 illustrates an exemplary parameter table of the operation process of the pixel circuit under two different data refresh rate.

Figure 1:
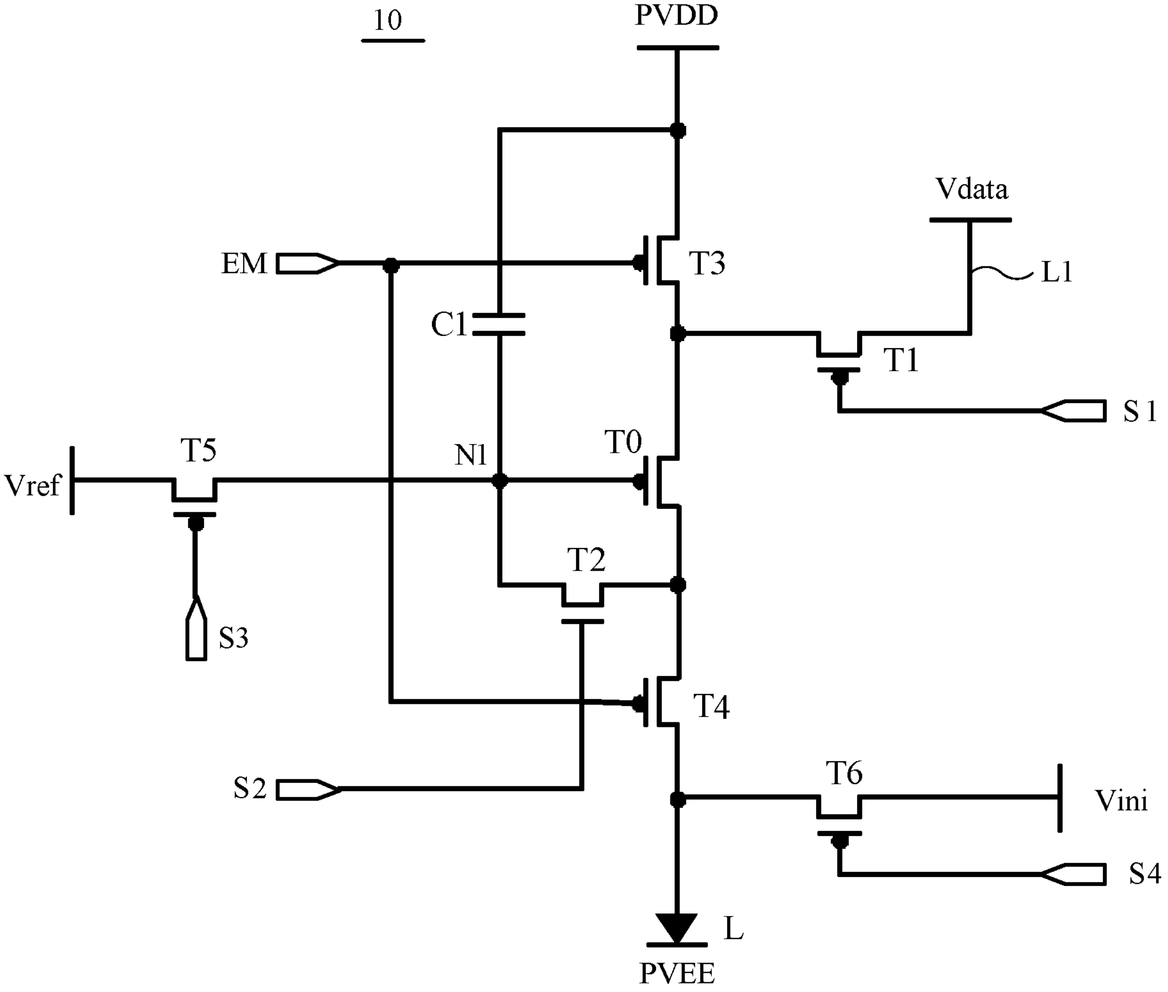
FIG. 1 illustrates a pixel circuit of an exemplary display panel according to various disclosed embodiments of the present disclosure.

In the drawings, the number for each component is as following: pixel circuit 10, data writing frame 11, holding frame 12, data signal line Data, light-emitting element L, driving transistor T, data refresh period S2, first data refresh period 20, second data refresh period 40, data adjustment stage 30, first data adjustment stage 31, second data adjustment stage 32, third data adjustment stage 33, first sub-data adjustment stage 311, second sub-data adjustment stage 321, and third sub-data adjustment stage 331.

DETAILED DESCRIPTION

To make the objectives, technical solutions, and advantages of the present disclosure clearer, the following further describes the present disclosure in detail with reference to the accompanying drawings and embodiments. It should be understood that the specific embodiments described here are only used to explain the present disclosure, and are not used to limit the present disclosure.

It should be noted that the directions or positional relationships indicated by the terms “above,” “below,” “left,” or “right,” etc. are based on the directions or positional relationships shown in the drawings, and are only for ease of description, rather than indicating or implying that the device or element referred to must have a specific orientation, be constructed and operated in a specific orientation, and therefore cannot be understood as a limitation of this disclosure. The terms “first” and “second” are only used for ease of description and cannot be understood as indicating or implying relative importance or implicitly indicating the quantity of technical features. The meaning of “plurality” means two or more than two, unless otherwise specifically defined. In addition, the terms “horizontal,” “vertical,” “overhanging” and other terms do not mean that the component is required to be absolutely horizontal or overhanging but may be slightly inclined. For example, “horizontal” only means that its direction is more “horizontal” than “vertical,” it does not mean that the structure must be completely horizontal but can be slightly inclined.

It should also be noted that, unless otherwise clearly specified and limited, the terms “set,” “install,” and “connected” should be understood in a broad sense, for example, it can be a fixed connection or a detachable connection, or integrally connected. It can be a mechanical connection or an electrical connection; it can be directly connected, or indirectly connected through an intermediate medium, and it can be the internal communication between the two components. For those of ordinary skill in the art, the specific meaning of the above-mentioned terms in this disclosure can be understood under specific circumstances.

To illustrate the technical solutions of the present disclosure, detailed descriptions are given below in conjunction with specific drawings and embodiments.

With the development of display technology, display panels are widely used in electronic devices such as mobile phones, notebooks, and computers. FIG. 1 is a schematic diagram of a pixel circuit structure of a display panel related to the present disclosure. As shown in FIG. 1, the display panel may include a light-emitting element L and a pixel circuit 10.

The light-emitting element L may be a light-emitting diode (LED), or an organic electroluminescence display (OLED, organic light-emitting semiconductor), etc.

The pixel circuit 10 may be connected to the data signal line L1. The data signal line L1 may be used to transmit the data signal Vdata. The pixel circuit 10 may include a driving transistor T0. The gate electrode of the driving transistor T0 may receive the data signal Vdata. The driving transistor T may be used to supply a driving current to the light-emitting element L.

The driving transistor T0 may be an oxide semiconductor transistor. For example, an indium gallium zinc oxide (IGZO) transistor, or a silicon transistor, for example, it may be a low temperature poly-silicon (LTPS) transistor, etc.

Further, the pixel circuit 10 shown in FIG. 1 may also include a data writing transistor T1 controlled by a control signal S1 for selectively providing a data signal Vdata; a compensation transistor T2 controlled by a control signal S2 for compensating the threshold voltage Vth of the driving transistor; light-emitting control transistors T3 and T4 controlled by the light-emitting control signal EM for selectively allowing the light-emitting element L to enter the light-emitting stage; a reset transistor T5 controlled by the control signal S3 for providing a reset signal to the gate electrode of the driving transistor T0; an initialization transistor T6 controlled by the control signal S4 for providing an initialization signal to the anode of the light-emitting element L.

In the pixel circuit provided in FIG. 1, how to reduce the power consumption has always been one of the most researched topics, and various methods for reducing the power consumption have emerged. Among them, in some cases, the effect of reducing the power consumption by reducing the data refresh frequency is significant. The low-data signal driving mode is called a low-frequency driving mode. For example, the data refresh frequency may be 1 Hz.

Figure 2:
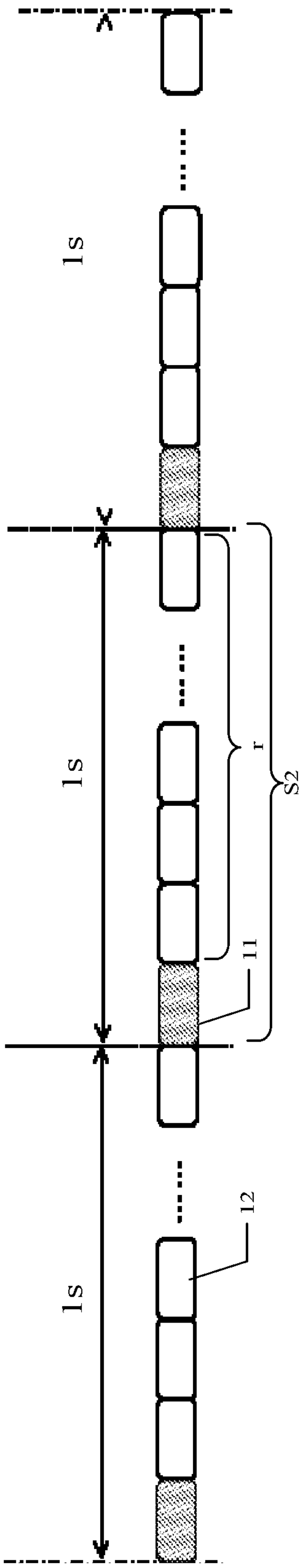
FIG. 2 illustrates an operation process of the pixel circuit of a display panel when the refresh rate is 1 Hz.

FIG. 2 is a schematic diagram of the operation process of the pixel circuit 10 when the data refresh frequency is 1 Hz. As shown in FIG. 2 and FIG. 1, in a single data refresh period S2, one frame of data writing frame 11 and multiple holding frames 12 are included. Among them, when the data is written in the data writing frame 11, the data signal Vdata is written to the gate of the driving transistor T from the data signal line L1. The main difference between the holding frame 12 and the data writing frame 11 is that, in the holding frame 12, the data voltage written by the previous data writing frame 11 is maintained without writing a new data voltage. For example, in the holding frame 12, the data signal line L1 may not write the data signal Vdata to the gate of the driving transistor T.

However, because of the data refresh timing settings of the holding frame 12 and the data writing frame 11, more holding frames 12 may exist between the data writing frames 11 of two adjacent data refresh periods S2, and the holding time of a same grayscale may be increased.

Because the light-emitting element L may be in the light-emitting stage at this time, the driving transistor T may work at an unsaturated state, and such a state may last for a long time, the drain current Id-the gate voltage Vg curve of the driving transistor T may drift, which may in turn cause the threshold voltage Vth of the driving transistor T to drift. When the holding frame 12 lasts longer, the drift of the threshold voltage Vth may be more obvious.

The drift of the threshold voltage Vth of the driving transistor T0 may cause the data signal Vdata received by the gate of the driving transistor T0 to be unstable, and the data signal Vdata may be a decisive factor for determining the driving current required by the light-emitting element L.

Thus, when the display panel transitions from a data refresh period S2 to a new data refresh period S2, when the gray scale changes, a large quantity of holding frames 12 between two adjacent data refresh periods S2 may cause the driving current to be unstable. According. the light-emitting element L may be unable to reach the expected brightness in subsequent refresh cycles.

Only after a few data refresh periods S2, the brightness of the light-emitting element L may slowly reach the expected brightness. However, in the low-frequency driving mode, a data refresh period S2 takes a longer time, and the total time after several data refresh periods S2 may be even longer. Therefore, the phenomenon that the luminous brightness does not reach the expected brightness may be easily observed by the human eyes and the reflected flicker may be formed in human eyes.

Figure 3:
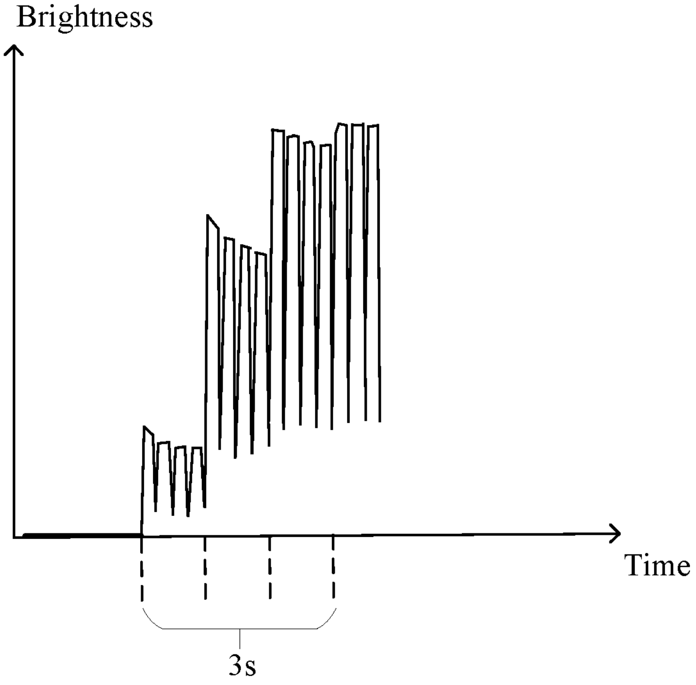
FIG. 3 illustrates a time-brightness curve when the gray scale of the display image is changed from 0 to 255 and when the refresh rate is 1 Hz.

For example, FIG. 3 is a time-brightness curve of the display screen transiting from a gray scale value of 0 to a gray scale value of 255 when the data refresh frequency is 1 Hz. Based on FIG. 1 and FIG. 3, the grayscale transition of the display screen needs to last for 3 seconds. In this transition phase, the actual luminous brightness of the light-emitting element L of the pixel circuit 10 does not reach the expected brightness, and the human eye can observe the flickering phenomenon of the display screen.

It should be noted that, in FIGS. 2-3, the data refresh frequency of 1 Hz is taken as an example to illustrate the display problems of the display panel in low frequency mode. It does not mean that such problems can only occur when the data refresh frequency is 1 Hz. When the data refresh frequency is low, for example, lower than 30 Hz, the flicker problem in the above example is prone to occur, and the solution provided in the present disclosure needs to be improved.

To solve the problem that the data writing frames 11 in the adjacent data refresh periods S2 is separated by more holding frames 12, which eventually causes the display panel to appear flicker that can be observed by the human eyes, on the basis of the technical solutions in FIGS. 1-2, the present disclosure redesigns the operation process of the pixel circuit 10 of the display panel.

Figure 4:
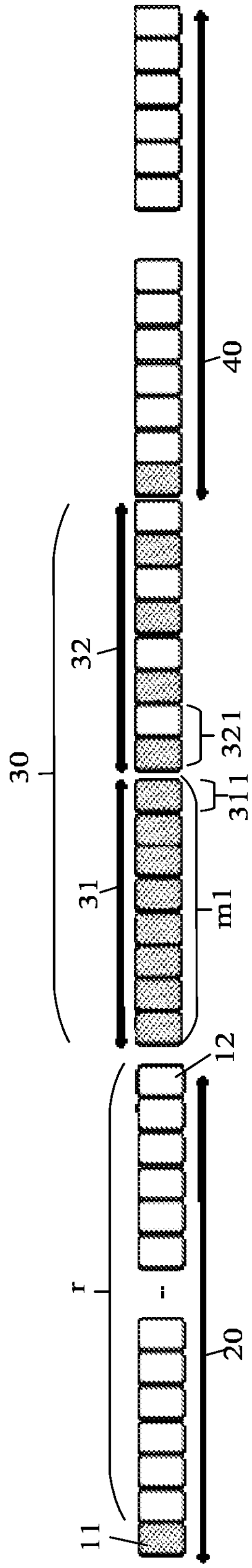
FIG. 4 illustrates an operation process of a pixel circuit of an exemplary display panel according to various disclosed embodiments of the present disclosure.

FIG. 4 is a schematic diagram of an operation process of a pixel circuit of an exemplary display panel according to an embodiment of the present disclosure. As shown in FIG. 4, the operation process of the pixel circuit 10 may include a first data refresh period 20, a data adjustment stage 30, and a second data refresh period 40 that are sequentially set. The structure of the holding frame 12 and the data writing frame 11 in the first data refresh period 20 and the second data refresh period 40 may be the same, and the data refresh time sequences of the holding frame 12 and the data writing frame 11 may also be set consistently.

For example, both the first data refresh period 20 and the second data refresh period 40 may include S2/S1 frames, and the S2/S1 frames may include at least one data writing frame 11 and r holding frames 12, and r≥0. Among them, S1 may be the frame refresh period of the pixel circuit 10, and the frame refresh frequency of the corresponding pixel circuit 10 may be F1, and F1 and S1 may be in a reciprocal relationship. S2 may be the data refresh period of the pixel circuit 10, and the data refresh frequency of the corresponding pixel circuit 10 may be F2, and F2 and S2 may be in a reciprocal relationship.

Further, it should be noted that in the concept of frame refresh frequency, the frame is calculated based on the minimum period of a light-emitting stage, and the frame may include a data writing frame and a holding frame. In the concept of data refresh frequency, the data refresh is based on the minimum period for writing data signal. A data refresh period may include at least one data writing frame and several holding frames.

Based on the foregoing description, when the data adjustment stage 30 is not set, the value of S2/S1 may be relatively large, and the value of r may also be relatively large. The data writing frame 11 of one data refresh period S2 and the data writing frame 11 of a next data refresh period S2 may be spaced by multiple holding frames 11. To this end, the data adjustment stage 30 may be provided between the first data refresh period 20 and the second data refresh period 40, and the data adjustment stage 30 may include a first data adjustment stage 31 and a second data adjustment stage 32 arranged in sequence.

FIG. 5 is a parameter table of the operation process of the pixel circuit in FIG. 4. Referring to FIG. 1, FIG. 4 and FIG. 5, the first data adjustment stage 31 may include T1 first sub-data adjustment stages 311 arranged in sequence. The first sub-data adjustment stage 311 may include m1 data writing frames 11 and n1 holding frames 12. T1≥1, m1≥0, n1≥0, and m1+n2≥1.

The second data adjustment stage 32 may include T2 second sub-data adjustment stages 321 arranged in sequence. The second sub-data adjustment stage 321 may include m2 data writing frames 11 and n2 holding frames 12. T2≥1, m2≥0, n2≥0, m2+n2≥1. Further, m1≥m2, and n1<n2<r.

It should be noted that the specific values in FIG. 5 and the following schematic diagrams are merely exemplary embodiments, and the values of various parameters are not necessarily limited to these. In other embodiments, the aforementioned parameters, such as T1, T2, m1, n1, and r may be selected according to the conditions, and they all fall within the scope of protection of this disclosure.

The data adjustment stage 30 may be set between the first data refresh period 20 and the second data refresh period 40. The data adjustment stage 30 may include T1 first sub-data adjustment stages 311 and T2 second sub-data adjustment stage 321 arranged in sequence. The data writing frame 11 and the holding frame 12 in the first sub-data adjustment stage 311 and the second sub-data adjustment stage 321 may satisfy the relationships of m1≥m2 and n1<n2<r. Thus, in the first data adjustment stage 31, the quantity m1 of the data writing frames 11 may be relatively large. For example, at this stage, through multiple data writing refreshes, the unstable input of the driving transistor T0 caused by the shift of threshold voltage Vth of the driving transistor T0 in the first data refresh period 20 may be reversed as quickly as possible.

The larger the quantity m1 of the data writing frames 11 is and the smaller the quantity n1 of the holding frames 12 is, the quicker the rapid reverse process may be. In one embodiment, when the quantity n1 of the holding frames 12 in the first data adjustment stage 31 is much smaller than the total quantity r of the holding frames 12 in the data refresh period S2, the time of the reverse process may be better reduced. Therefore, the design in which the first data adjustment stage 31 and the second data adjustment stage 32, and the quantity of data writing frames 11 and holding frames 12 may meet certain relationships may avoid the data refresh process when the human eyes can observe that the luminous brightness does not reach the expected brightness. Accordingly, the problem of the screen flicker observed by human eyes when the display screen is switched may be solved.

Further, the quantity m1 of the data writing frames 11 in the first sub-data adjustment stage 311 may be set to be greater than or equal to the quantity m2 of the data writing frames 11 in the second sub-data adjustment stage 321, and the quantity of n1 of the holding frames 12 in the first sub-data adjustment stage 311 may be smaller than the quantity n2 of the holding frames 12 in the second sub-data adjustment stage 321. Such a configuration may mainly consider that, after quickly writing data signals to the gate of the driving transistor T for m1 times, if rapidly entering the second data refresh period 40, the quantity of holding frames 12 may increase sharply. At this time, in the first few holding frames 12 of the second data refresh period 40, the state of the driving transistor T0 may be still unstable, and the flicker phenomenon that can be observed by the human eyes may occur again.

Therefore, by setting the second data adjustment stage 32, the quantity of the holding frames 12 may be increased relative to the quantity of the holding frames 12 in the first data adjustment stage 31, after the state of the to-be-driven transistor T is adjusted by a buffered procedure, the second data refresh period 40 may be entered. For example, when the first data adjustment stage 31 to the second data adjustment stage 32 are sequentially arranged, the quantity of the holding frames 12 may be gradually increased from n1 to n2. Thus, the direct transition from the first data adjustment stage 31 to the second data refresh period 40 may be avoided. Accordingly, the occurrence of the flicker phenomenon caused by the drastic change of the data amount of the holding frames 12 which may cause the state of the driving transistor T0 to be unstable may be avoided.

Referring to FIGS. 1-5, in another exemplary embodiment, when the brightness of the light-emitting element L in the first data refresh period 20 is less than the brightness of the light-emitting element L in the second data refresh period 40, the above-mentioned data adjustment stage 30 may be set between the first data refresh period 20 and the second data refresh period 40.

It should be noted that the display brightness of the first data refresh period 20 may be relatively small, and the display brightness of the second data refresh period 40 may be relatively high, which may actually be a transition from a low grayscale to a high grayscale. Especially when the display brightness difference between the first data refresh period 20 and the second data refresh period 40 is substantially large, the grayscale transition process may take a long time, as shown in FIG. 3, which will easily cause the human eye to observe the screen flicker. Therefore, in this case, a special attention may need to be paid to shorten the grayscale transition time. This problem may be solved well by setting the above-mentioned data adjustment stage 30 during the transition from the low grayscale level to the high grayscale level.

It should also be noted that, in another embodiment, when the brightness of the light-emitting element L in the first data refresh period 20 is greater than or equal to the brightness of the light-emitting element L in the second data refresh period 40, the above-mentioned data adjustment stage 30 may not be provided between the first data refresh period 20 and the second data refresh period 40. While avoiding the flicker phenomenon from being observed by human eyes, the power consumption of the display panel may be reduced.

In still another optional embodiment, the quantity of the aforementioned first sub-data adjustment stages 311 may be greater than the quantity of the second sub-data adjustment stages 321. For example, T1>T2.

Based on the foregoing analysis, the function of the first data adjustment stage 31 may be to shorten the grayscale transition time. In the first sub-data adjustment stage 311, the quantity m1 of the data writing frames 11 may be relatively large in the first sub-data adjustment stage 311; and the quantity n1 of the holding frames 12 may be relatively small. If the quantity T1 of the first sub-data adjustment stages 311 is relatively large, the data refresh times in the first data adjustment stages 31 may be be increased, and the refresh frequency may be increased. Accordingly, the grayscale transition time may be ensured to be as short as possible.

It should be noted that the function of the second data adjustment stage 32 may be mainly used to make the quantity of the holding frames 12 be smoothly transited from less to more. Therefore, the quantity T2 of the second sub-data adjustment stages 321 may not need to be large, and only need to be used to adjust the state of the driving transistor T0 gently. Therefore, the quantity T1 of the first sub-data adjustment stages 311 may be greater than the quantity T2 of the second sub-data adjustment stages 321.

Figure 6:
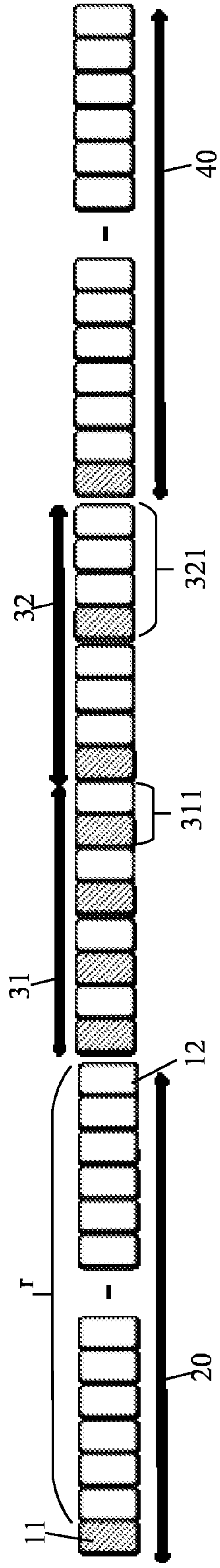
FIG. 6 illustrates an operation process of a pixel circuit of another exemplary display panel according to various disclosed embodiments of the present disclosure.

FIG. 6 is a schematic diagram of an operation process of a pixel circuit of another exemplary display panel according to various disclosed embodiments of the present disclosure, and FIG. 7 is a parameter table of the operation process of the pixel circuit in FIG. 6. As shown in FIGS. 6-7, the quantity T2 of the second sub-data adjustment stages 321 shown in FIGS. 4-5 may be 4. In some embodiments, the quantity T2 of the second sub-data adjustment stages 321 may be another value smaller than the quantity T1 of the first sub-data adjustment stages 311, for example, T2 may be 3. The quantity T2 of the second sub-data adjustment stages 321 shown in FIGS. 6-7 is 2, which is smaller than the quantity T1 of the first sub-data adjustment stages 311. In some embodiments, the quantity T1 of the first sub-data adjustment stages 311 may also be a positive integer time of the quantity T2 of the second sub-data adjustment stages 321. For example, the relationship between T1 and T2 may satisfy the following relationship: T1=k×T2. K is a positive integer. In FIGS. 4-7, K=T1/T2=2.

By setting the quantity of the first sub-data adjustment stages 311 to the quantity of the second sub-data adjustment stages 321 to be reduced by multiple times in the data adjustment stage 30, on the one hand, the accelerating and reversal adjustment function of the first sub-data adjustment stages 311 may be ensured, and on the other hand, the smooth transition function of the second sub-data adjustment stages 321 may also be guaranteed.

Further, on this basis, the relationship between the total quantity of frames in the first sub-data adjustment stages 311 and the second sub-data adjustment stages 321 may be set, for example, it may be (m2+n2)=k×(m1+n1). Combining with T1=k×T2, it may be guaranteed that T1×(m1+n1)=T2×(m2+n2). For example, the total quantity of frames input in the first data adjustment stages 31 may be equal to the total quantity of frames input in the second data adjustment stages 32.

Further, referring to FIG. 4 and FIG. 5, the total quantity of frames of the first sub-data adjustment stages 311 shown therein is (m1+n1)=1, the quantity of the first sub-data adjustment stages 311 is T1=8, the total quantity of frames in the second sub-data adjustment stages 321 is (m2+n2)=2, and the quantity of the second sub-data adjustment stage 321 is T2=4. Thus, k=(m2+n2)/(m1+n1)=2/1=2, and T1×(m1+n1)=T2×(m2+n2)=8.

In some embodiments, referring to FIGS. 6-7, the total quantity of frames of the first sub-data adjustment stages 311 is shown as (m1+n1)=2, the quantity of the first sub-data adjustment stages 311 is T1=4, and the total quantity of frames of the second sub-data adjustment stages 311 is (m2+n2)=4, and the quantity of the second sub-data adjustment stages 321 is T2=2. Thus, k=(m2+n2)/(m1+n1)=4/2=2, and T1×(m1+n1)=T2×(m2+n2)=8.

Such a setting may ensure that the total quantity of frames input in each data adjustment stage 30 may be equal, and the adjustment time of the driving transistor T in each data adjustment stage 30 may be same. Accordingly, the situation that it is too long in some data adjustment stages 30 and it is too short in other data adjustment stages 30 may be avoided. Such a situation may cause the transition state of the driving transistor T0 not to be smooth. Accordingly, the flicker problem that can be observed by the human eyes may be avoided.

Referring to FIGS. 4-5, in another embodiment, the quantity m1 of the data writing frames 11 in the first sub-data adjustment stage 311 may be 1, and the quantity n1 of the holding frames 12 in the first sub-data adjustment stage 311 may be 0. Thus, at this time, the T1 first sub-data adjustment stages 311 may continuously perform the data writing, and the holding frame 12 may not be set between adjacent first sub-data adjustment stages 311. Accordingly, the time of driving the transistor T may be reduced as much as possible; and the flicker that may be observed by the human eyes may be effectively reduced.

Further, referring to FIGS. 4-7, the quantity of the data writing frames 11 and the holding frames 12 in the second sub-data adjustment stage 321 may also be limited. In one embodiment, the quantity of the data writing frames 11 in the second sub-data adjustment stage 321 may be m2=1, and the quantity of the holding frames may be n2≥1. In another embodiment, the quantity of the data writing frames 11 in the second sub-data adjustment stage 321 may be m2>1, and the quantity of holding frames 12 may be n2≥m2. The quantity relationship between the data writing frames 11 and the holding frames 12 in the second sub-data adjustment stage 321 may be determined according to the value of n2.

When m2=1 and n2≥1, when the actual pixel circuit 10 is operated in the T2 second sub-data adjustment stages 321, after one data writing frame 11 writes data signals to the gate of the driving transistor T, there may be several holding frames 12 before proceeding to the next data writing frame 11 to write the data signal. Such a situation may apply to the situation when n2 is relatively small, and the data writing frames 11 and the holding frames 12 may be uniformly distributed. The uniform distribution of the data writing frames 11 and the holding frames 12 may facilitate to stabilize the state of the driving transistor T0 in time.

When m2>1, n2≥m2, for example, m2=2=n2, when the actual pixel circuit 10 is operated in the T2 second sub-data adjustment stages 321, after several data writing frames 11, several holding frames 12 may be written. Such a situation may be suitable when n2 is relatively large. Because if one frame of data writing frame 11 is written first, then it enters the longer-term holding frame 12, the time of the holding frame 12 may be relatively long, which may in turn make the threshold voltage Vth of the driving transistor T to drift. Accordingly, the flicker phenomenon may reappear. Therefore, by first inputting a plurality of data writing frames 11 and then inputting a plurality of holding frames 12, the state of the driving transistor T may be ensured.

Figure 8:
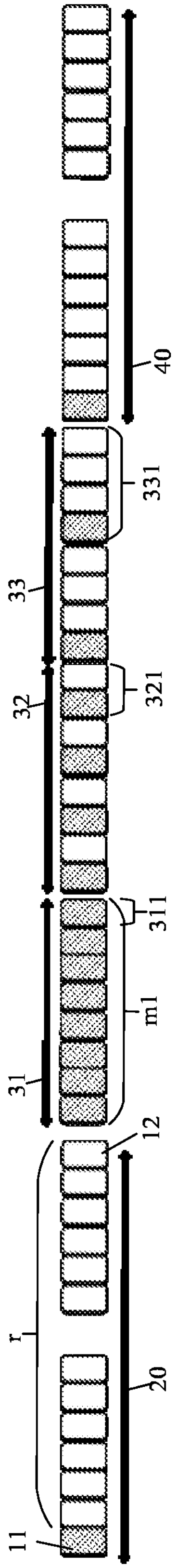
FIG. 8 illustrates an operation process of a pixel circuit of another exemplary display panel according to various disclosed embodiments of the present disclosure.

FIG. 8 is a schematic diagram of an operation process of a pixel circuit of another exemplary display panel according to various disclosed embodiments of the present disclosure. FIG. 9 is a parameter table of the operation process of the pixel circuit in FIG. 8. As shown in FIGS. 8-9 and FIG. 1, in this operation process, the data adjustment stage 30 may also include a third data adjustment stage 33. Between the first data refresh period 20 and the second data refresh period 40, the first data adjustment stage 31, the second data adjustment stage 32, and the third data adjustment stage 33 may be arranged in sequence.

The third data adjustment stage 33 may include T3 third sub-data adjustment stages 331 arranged in sequence, and the third sub-data adjustment stage 331 may include m3 data writing frames 11 and n3 holding frames 12. T3≥1, and m3≥0, n3≥0, and m3+n3≥1. m2≥m3, and n2<n3<r.

In this embodiment, after the first data adjustment stage 31 and the second data adjustment stage 32, a third data adjustment stage 33 may be provided. Compared with the data writing frame 11 and the holding frame 12 in the second sub-data adjustment stage 321, the quantity of the data writing frames 11 in the third sub-data adjustment stage 331 of the third data adjustment stage 33 may be reduced, the quantity of the data holding frames 12 may be increased. Such a configuration may be closer to the combination of the holding frames 12 and the data writing frames 11 in the second data refresh period 40. Thus, the transition from the second data adjustment stage 32 to the second data refresh period 40 may be smoother.

On this basis, it may be also possible to limit the difference between the total frame quantity of the two adjacent sub-data adjustment stages. For example, the difference d1 in the frame quantity between the third sub-data adjustment stage 331 and the second sub-data adjustment stage 321 may be greater than the difference d2 in the frame quantity between the second sub-data adjustment stage 321 and the first sub-data adjustment stage 311.

Among them, d1=(m3+n3)−(m2+n2), and d2=(m2+n2)−(m1+n1). For the example illustrated in FIGS. 8-9, d1=(1+3)−(1+1)=2, d2=(1+1)−(1+0)=1, and d1>d2.

Through the above-mentioned design of the total frame quantity differences, the quantity of holding frames 12 may be gradually increased from the first data adjustment stage 31, the second data adjustment stage 32 to the third data adjustment stage 33. The reason for this setting may be that the function of the first data adjustment stage 31 is to achieve the purpose of quickly input the data writing frames 11. Therefore, the quantity n1 of the holding frames 12 in the first sub-data adjustment stage 311 may be generally small. The second data adjustment stage 32 and other adjustment stages, such as the third data adjustment stage 33, may be used to solve the smooth transition from a rapid refresh stage to the second data refresh period 40.

When the period of the second data refresh period 40 is relatively large, the smooth transition span may be relatively large. Then, when setting d1=(m3+n3)−(m2+n2)>d2=(m2+n2)−(m1+n1), the change span of the quantity of holding frames 12 in the transition stage may be appropriately increased such that the second data refresh period 40 may be switched in quickly.

It may also be possible to limit the relationship between the total quantity of frames in the two adjacent sub-data adjustment stages 30. For example, the ratio d3 of the total quantity of frames in the third sub-data adjustment stage 331 and the second sub-data adjustment stage 321 may be equal to the ratio d4 of the total quantity of frames in the second sub-data adjustment stage 321 to the total quantity of frames in the first sub-data adjustment stage 311. The mathematical expression of such a relationship may be:

$$d3=(m3+n3)/(m2+n2)=d4=(m2+n2)/(m1+n1)\geq 1.$$

In the example illustrated in FIGS. 8-9, d3=(1+3)/(1+1) =d4=(1+1)/(1+0)=2.

The total quantity of frames in the sub-data adjustment stage 30 may be changed in a proportional manner. On the one hand, the quantity of holding frames 12 may be changed to a larger span, and on the other hand, the obvious difference in the changing process may be avoided. Thus, the changing process of the state of the driving transistor T may be relatively uniform; and the drastic change may be avoided.

Further, referring to FIGS. 1 and FIGS. 8-9, in the data adjustment stages 30, the quantity T1 of the first sub-data adjustment stages 311 may be greater than the quantity T2 of the second sub-data adjustment stages 321, and the quantity T2 of the second sub-data adjustment stages 321 may be greater than or equal to the quantity T3 of the third sub-data adjustment stages 331.

The reason that the quantity T1 of the first sub-data adjustment stage 311 may be greater than the quantity T2 of the second sub-data adjustment stage 321 may be that the function of the first data adjustment stages 31 may be for a rapid refresh, and the function of the second data adjustment stages 32 may be for a smooth transition.

Generally, the quantity T1 of the first sub-data adjustment stage 311 may be required to be relatively large to ensure that the state of the driving transistor T0 may be quickly refreshed to normal.

If the quantity T2 of the second sub-data adjustment stage 321 is relatively small, the total quantity of frames in the data adjustment stage 30 may be reduced, and the time of the data adjustment stage 30 may be prevented from being too long.

The reason that the quantity T2 of the second sub-data adjustment stages 321 may be greater than or equal to the quantity T3 of the third sub-data adjustment stages 331 may be that the quantity n3 of the holding frames 12 in the third sub-data adjustment stage 331 in the third data adjustment stage 33 may be relatively large and the value of the total quantity (m3+n3) of the data holding frames 12 and the data writing frames 11 in a single third sub-data adjustment stage 331 may be relatively large. If T3 is too large, the total quantity of frames of the third data adjustment stages 33 may be too large, making the time of the data adjustment stages 30 may be too long. Therefore, the quantity T3 of the third sub-data adjustment stages 331 may be set to be less than or equal to the quantity T2 of the second sub-data adjustment stages 321. Such a configuration may prevent the data adjustment stages 30 from being too long.

Further, referring to FIG. 1 and FIGS. 8-9, in another embodiment, the relationship between the difference between the quantity T2 of the second sub-data adjustment stages 321 and the quantity T1 of the first sub-data adjustment stages 311 and the difference between the quantity T3 of the third sub-data adjustment stages 331 and the quantity T2 of the second sub-data adjustment stages 321 may be set, for example, T1−T2>T2-T3. In FIGS. 8-9, T1−T2=4>T2−T3=2.

Based on the foregoing statement, it may be seen that the functions of the first sub-data adjustment stages 311, the second sub-data adjustment stages 321, and the third sub-data adjustment stages 331 may be different.

It can be understood that when the quantity of sub-data adjustment stages is set, the difference between the quantity T1 of the first sub-data adjustment stages 311 and the quantity T2 of the second sub-data adjustment stages 321 may be relatively large, and the difference between the quantity T2 of the second sub-data adjustment stages 321 and the quantity T3 of the third sub-data adjustment stage 331 may be relatively small. Thus, while ensuring that the state of the driving transistor T0 may be quickly refreshed to be normal, a smooth transition from the data adjustment phase 30 to the second data refresh period 40 may be ensured, and the data adjustment phase 30 may not take too long.

In still another embodiment, the quantity ratios of the first sub-data adjustment stages 311 and the second sub-data adjustment stages 321 may be set in equal proportions, and the quantity ratios of the second sub-data adjustment stages 321 and the third sub-data adjustment stages 331 may be set in equal proportions. For example, T1/T2=T2/T3. Referring to FIG. 1, FIGS. 8-9, T1/T2=8/4=T2/T3=4/2.

By making the ratios of the quantity of adjacent sub-data adjustment stages equal, the quantity T1 of the first sub-data adjustment stages 311, the quantity T2 of the second sub-data adjustment stages 321 and the quantity T3 of the third sub-data adjustment stages 331 may be reduced relatively fast, and large or small gaps between the adjustment stages may be avoided. Accordingly, the transition may be relative uniform.

Referring to FIGS. 8-9, on the basis of setting the first data adjustment stages 31, the second data adjustment stages 32 and the third data adjustment stages 33 in sequence in the data adjustment stage 30, the total quantity of frames in each stage may remain same. For example, T1×(m1+n1)=T2×(m2+n2)=T3×(m3+n3). In FIG. 11, the total quantity of frames in each data adjustment stage 30 is 8.

It is understandable that the total quantity of frames in each data adjustment stage 30 may remain same, the length of the state adjustment time of the driving transistor T in each data adjustment stage 30 may be same. Thus, the situation that some stages are too long and some stages are too short may be avoided. If some stages are too long and some stages are too short, the driving transistor T may have different time in different states, which may cause it to be unstable.

Figure 10:
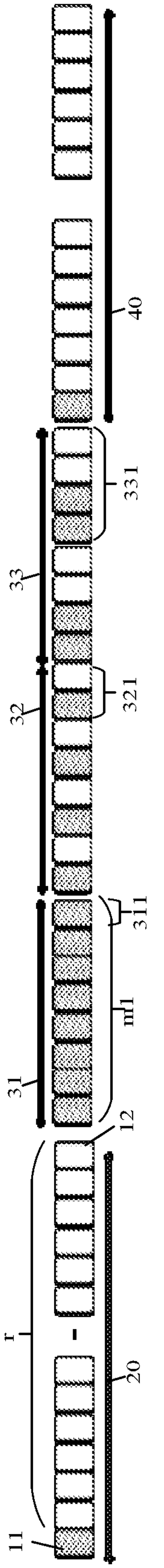
FIG. 10 illustrates an operation process of a pixel circuit of another exemplary display panel according to various disclosed embodiments of the present disclosure.

FIG. 10 is a schematic diagram of an operation process of a pixel circuit of another exemplary display panel according to various disclosed embodiments of the present disclosure, and FIG. 11 is a parameter table of the operation process of the pixel circuit in FIG. 10. As shown in FIGS. 8-11, in some embodiments, in the first sub-data adjustment stage 311, the quantity of data writing frames 11 may be m1=1, and the quantity of holding frames 12 may be n1≥0; and in the second sub-data adjustment stage 321, the quantity of data writing frames 11 may be m2=1, and the quantity of holding frames 12 may be n2≥1; and in the third sub-data adjustment stage 331, the quantity of data writing frames 11 may be m3>1, and n3≥m3. Among them, as shown in FIG. 8 and FIG. 9, m1=1, n1=0; m2=1, n2=1; m3=1, n3=3, and such a combination may satisfy the above-mentioned relationship. As shown in FIG. 10 and FIG. 11, m1=1, n1=0; m2=1, n2=1, n3=2, m3=2, and such a combination may also satisfy the above-mentioned magnitude relationship.

It is understandable that when the first data adjustment stage 31 is switched to the second data adjustment stage 32, both n1 and n2 of the holding frames 12 may be still relatively small. Thus, after wring one frame of data writing frame 11, and a holding frame 12 may be written, and then a data writing frame 11 may be written again, such that the data writing frame 11 and the holding frame 12 may be evenly distributed. Such a sequence may facilitate to stabilize the state of the driving transistor T in time.

When the second data adjustment stage 32 is switched to the third data adjustment stage 33, the quantity of holding frames 12 may be gradually increased, and the quantity n3 of the third sub-data adjustment stages 331 may be relatively large. Therefore, the way of inputting the multiple data writing frames 11 firstly, and then inputting a plurality of holding frames 12 may ensure the state of the driving transistor T.

FIG. 12 is a parameter table of the operation process of the pixel circuit under two different data refresh frequencies. As shown in FIG. 1, FIG. 4, FIG. 6 and FIG. 12, based on the structure shown in FIG. 1, in another embodiment, the operation process of the above-mentioned pixel circuit 10 may include a first data refresh frequency F21 and a second data refresh frequency F22, and F21<F22<F1.

Referring to FIG. 1 and FIG. 4, when the pixel circuit 10 is operated at the first data refresh frequency F21, the first data adjustment stage 31 may include T11 first sub-data adjustment stages 311 arranged in sequence, and the second data adjustment stage 32 may include T12 second sub-data adjustment stages 321 set in sequence.

Referring to FIG. 1 and FIG. 6, when the pixel circuit 10 is operated at the second data refresh frequency F22, the first data adjustment stage 31 may include T21 first sub-data adjustment stages 311 arranged in sequence, and the second data adjustment stage 32 may include T22 second sub-data adjustment stages 321 set in sequence. T11>T21, and/or, T12>T22.

It should be noted that the first data refresh frequency F21 and the second data refresh frequency F22 may be two different low frequencies, and F21<F22. When the pixel circuit 10 is operated at the corresponding data refresh frequency, for the relatively high data refresh frequency F22, the holding time of the holding frame 12 of the adjacent data refresh periods S2 may be relatively short. The offset of the threshold voltage Vth of the gate of the driving transistor T0 may be not as serious as when the pixel circuit is operated at the first data refresh frequency F21. Therefore, when the quantity of holding frames 12 is set, the quantity of holding frames 12 in the first sub-data adjustment stage 311 may be less than the quantity of holding frames 12 in the first sub-data adjustment stage 311 when the pixel circuit 10 is operated at a relatively low data refresh frequency F21.

When the pixel circuit 10 works at the second data refresh frequency F22, the quantity of the first sub-data adjustment stages 311 may also be appropriately smaller than the quantity of the first sub-data adjustment stages 311 when the pixel circuit 10 is operated at the first data refresh frequency F21 to reduce the time of the data adjust stage 30.

In contrast, when the pixel circuit 10 is operated at the first data refresh frequency F21, the quantity of the first sub-data adjustment stages 311 may relatively large. Thus, the state of the driving transistor T0 may be ensured to be quickly and completely adjusted.

By adjusting the quantity of holding frames 12 in the data adjustment stage 30 and the quantity of the sub-data adjustment stages 30 adaptively when the pixel circuit 10 is operated at different data refresh frequencies, the time of the data adjustment stage 30 may be flexibly adjusted while avoiding the flickering phenomenon that can be observed by the human eyes.

Referring to FIG. 1, FIG. 4, FIG. 6 and FIG. 12, in which FIG. 4 is a schematic diagram of the operation process of the above-mentioned pixel circuit 10 at the first data refresh frequency F21, the difference between the quantity n2 of the holding frames 12 in the second sub-data adjustment stage 321 and the quantity n1 of the holding frames 12 in the first sub-data adjustment stage 311 may be R1; and R1 may be 1−0=1.

In FIG. 6, the difference between the quantity m2 of holding frames 12 in the second sub-data adjustment stage 321 and the quantity m1 of holding frames 12 in the first sub-data adjustment stage 311 when the pixel circuit 10 is operated at the second data refresh frequency F22 may is R2; and R1>R2. R2 may be 3−1=2, and at this time, R2=2>R1=1.

Based on the foregoing description, it can be seen that the first data refresh frequency F21 may be less than the second data refresh frequency F22. When the pixel circuit 10 is operated at a relatively low data refresh frequency, for example, the first data refresh frequency F21, the data refresh period S2 may have a relatively larger span. Therefore, to reduce the time of the data adjustment stage 30, the span of the holding frames 12 in each data adjustment stage when the pixel circuit 10 is operated at the first data refresh frequency F21 may be maintained at relatively large.

Referring to FIG. 1, and FIGS. 6-9, of which FIG. 1 and FIG. 8 and FIG. 9 show that, when the above pixel circuit 10 is operated at the first data refresh frequency F21, the data adjustment stage 30 may include N1 data adjustment stages sequentially from the first data adjustment stage 31 to the N1-th data adjustment stage 30, and N1≥1. In one embodiment, N1=3.

FIG. 1, FIG. 6 and FIG. 7 show that, when the pixel circuit 10 is operated at the second data refresh frequency F22, the data adjustment stage 30 may include N2 data adjustment stages sequentially from the first data adjustment stage 31 to the N2-th data adjustment stage 30, N2≥1, and N1>N2. In one embodiment, N2=2.

The reason for such a setting may be that, when the data refresh frequency is relatively low, the difference between the quantity of holding frames 12 in the normal data refresh period S2 and the quantity of holding frames 12 in the first data adjustment stage 31 may be relatively large, thus, more subsequent data adjustment stages 30 may be required to achieve a smooth transition. In the case that the data refresh frequency is relatively high, only a small quantity of subsequent data refresh stages other than the first data adjustment stage 31 may be needed to achieve a smooth transition.

Figure 13:
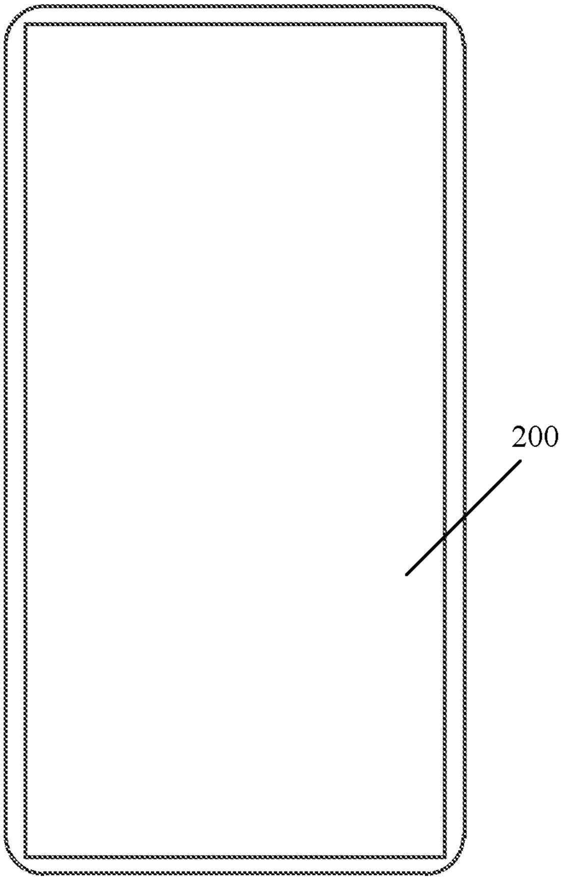
FIG. 13 illustrates an exemplary display panel according to various disclosed embodiments of the present disclosure.

The display panel according to the embodiment of the present disclosure is described in detail above with reference to FIGS. 1 to 12. On this basis, the present disclosure also provides a display device. FIG. 13 is a schematic diagram of an exemplary display device according to various disclosed embodiments of the present disclosure.

As shown in FIG. 13, the display device may include the display panel 200 provided by any of the foregoing embodiments. The display device may be at least one of a wearable device, a camera, a mobile phone, a tablet computer, a display screen, a television, and a vehicle display terminal. The display device may include the display panel provided in the above-mentioned embodiment; thus the display device may have all the beneficial effects of the above-mentioned display panel.

Thus, in the display panel and the display device provided by the embodiments of the present disclosure, a first data adjustment stage and a second data adjustment stage may be sequentially arranged between the first data refresh period and the second data refresh period. The first data adjustment stage may include T1 first sub-data adjustment stages, and the second data adjustment stage may include T2 second sub-data adjustment stages. The quantity of data writing frames in the first sub-data adjustment stage may be greater than or equal to the quantity of data writing frames in the second sub-data adjustment stage, and the quantity of holding frames in the first sub-data adjustment stage may be less than the quantity of holding frames in the second sub-data adjustment stage. Therefore, it may be possible to quickly reverse the unstable input signal of the driving transistor caused by the first data refresh period in the low-frequency driving mode before the second data refresh period. Thus, the flicker observed by the human eyes when the display screen is switched may be avoided.

In addition, the term "and/or" in this article is only an association relationship describing associated objects, which means that there may be three kinds of relationships, for example, A and/or B, which may mean that A alone exists, and A and B exist at the same time, or B exists alone. In addition, the character "/" in this text generally indicates that the associated objects before and after are in an "or" relationship.

It should be understood that in the embodiment of the present disclosure, "B corresponding to A" may mean that B is associated with A, and B can be determined according to A. However, it should also be understood that determining B based on A does not mean that B is determined only based on A, and B may also be determined based on A and/or other information.

The above are only specific embodiments of the present disclosure, but the protection scope of the present disclosure is not limited thereto. Any person skilled in the art can easily think of various equivalent modifications or changes within the technical scope disclosed in the present disclosure. Equivalent modifications or replacements should all be covered within the protection scope of the present disclosure. Therefore, the protection scope of the present disclosure should be subject to the protection scope of the claims.

What is claimed is:

1. A display panel, comprising:

a pixel circuit;

wherein:

an operation process of the pixel circuit includes a first data refresh period, a data adjustment stage, and a second data refresh period set in sequence, the data adjustment stage includes a first data adjustment stage, a second data adjustment stage, and a third data adjustment stage set in sequence;

the first data adjustment stage includes T1 first sub-data adjustment stages set in sequence, each first sub-data adjustment stage includes m1 data writing frames and n1 holding frames, T1≥1, m1≥0, n1≥0, and m1+n1≥1;

the second data adjustment stage includes T2 second sub-data adjustment stages set in sequence, each second sub-data adjustment stage includes m2 data writing frames and n2 holding frames, T2≥1, m2≥0, n2≥0, and m2+n2≥1;

the third data adjustment stage includes T3 third sub-data adjustment stages set in sequence, each third sub-data adjustment stage includes m3 data writing frames and n3 holding stages set in sequence, T3≥1, m3≥0, n3≥0, and m3+n3≥1;

$$n1<n2<n3, \text{ or } m1>m2>m3;$$

$$T1>T2\geq T3,\ T1-T2>T2-T3;$$

$$(m3+n3)-(m2+n2)>(m2+n2)-(m1+n1); \text{ and}$$

$$(m3+n3)/(m2+n2)=(m2+n2)/(m1+n1)\geq 1.$$

2. The display panel according to claim 1, wherein:

a brightness of a light-emitting element in the first data refresh period is less than a brightness of the light-emitting element in the second data refresh period.

3. The display panel according to claim 1, wherein:

$$T1/T2=T2/T3.$$

4. A display device comprising the display panel according to claim 1.

5. A display panel, comprising:

a pixel circuit;

wherein:

an operation process of the pixel circuit includes a first data refresh period, a data adjustment stage, and a second data refresh period set in sequence, the data adjustment stage includes a first data adjustment stage, a second data adjustment stage, and a third data adjustment stage set in sequence;

the first data adjustment stage includes T1 first sub-data adjustment stages set in sequence, each first sub-data adjustment stage includes m1 data writing frames and n1 holding frames, T1≥1, m1≥0, n1≥0, and m1+n1≥1;

the second data adjustment stage includes T2 second sub-data adjustment stages set in sequence, each second sub-data adjustment stage includes m2 data writing frames and n2 holding frames, T2≥1, m2≥0, n2≥0, and m2+n2≥1;

the third data adjustment stage includes T3 third sub-data adjustment stages set in sequence, each third sub-data adjustment stage includes m3 data writing frames and n3 holding stages set in sequence, T3≥1, m3≥0, n3≥0, and m3+n3≥1;

$$n1<n2<n3, \text{ or } m1>m2>m3; \text{ and}$$

at least one of following:

$$T1>T2>T3,\ T1-T2>T2-T3, \text{ and } (m3+n3)-(m2+n2)>(m2+n2)-(m1+n1); \text{ or}$$

$$(m3+n3)-(m2+n2)>(m2+n2)-(m1+n1), \text{ and } (m3+n3)/(m2+n2)=(m2+n2)/(m1+n1)\geq 1; \text{ or}$$

$$T1>T2>T3,\ T1-T2>T2-T3, \text{ and } (m3+n3)/(m2+n2)=(m2+n2)/(m1+n1)\geq 1.$$

6. The display panel according to claim 5, wherein:

a brightness of a light-emitting element in the first data refresh period is less than a brightness of the light-emitting element in the second data refresh period.

7. The display panel according to claim 5, wherein:

$$T1/T2=T2/T3.$$

8. A display device comprising the display panel according to claim 5.

9. A display panel, comprising:

a pixel circuit;

wherein:

an operation process of the pixel circuit includes a first data refresh period, a data adjustment stage, and a second data refresh period set in sequence, the data adjustment stage includes a first data adjustment stage, a second data adjustment stage, and a third data adjustment stage set in sequence;

the first data adjustment stage includes T1 first sub-data adjustment stages set in sequence, each first sub-data adjustment stage includes m1 data writing frames and n1 holding frames, $T1\geq1$, $m1\geq0$, $n1\geq0$, and $m1+n1\geq1$;

the second data adjustment stage includes T2 second sub-data adjustment stages set in sequence, each second sub-data adjustment stage includes m2 data writing frames and n2 holding frames, $T2\geq1$, $m2\geq0$, $n2\geq0$, and $m2+n2\geq1$;

the third data adjustment stage includes T3 third sub-data adjustment stages set in sequence, each third sub-data adjustment stage includes m3 data writing frames and n3 holding stages set in sequence, $T3\geq1$, $m3\geq0$, $n3\geq0$, and $m3+n3\geq1$;

$$n1<n2<n3, \text{ or } m1>m2>m3; \text{ and}$$

at least one of following:

$$T1>T2>T3,\ T1-T2>T2-T3; \text{ or}$$

$$(m3+n3)-(m2+n2)>(m2+n2)-(m1+n1); \text{ or}$$

$$(m3+n3)/(m2+n2)=(m2+n2)/(m1+n1)>1.$$

10. The display panel according to claim 9, wherein:

a brightness of a light-emitting element in the first data refresh period is less than a brightness of the light-emitting element in the second data refresh period.

11. The display panel according to claim 9, wherein:

$$T1/T2=T2/T3.$$

12. A display device comprising the display panel according to claim 9.

* * * * *